Patented June 23, 1936

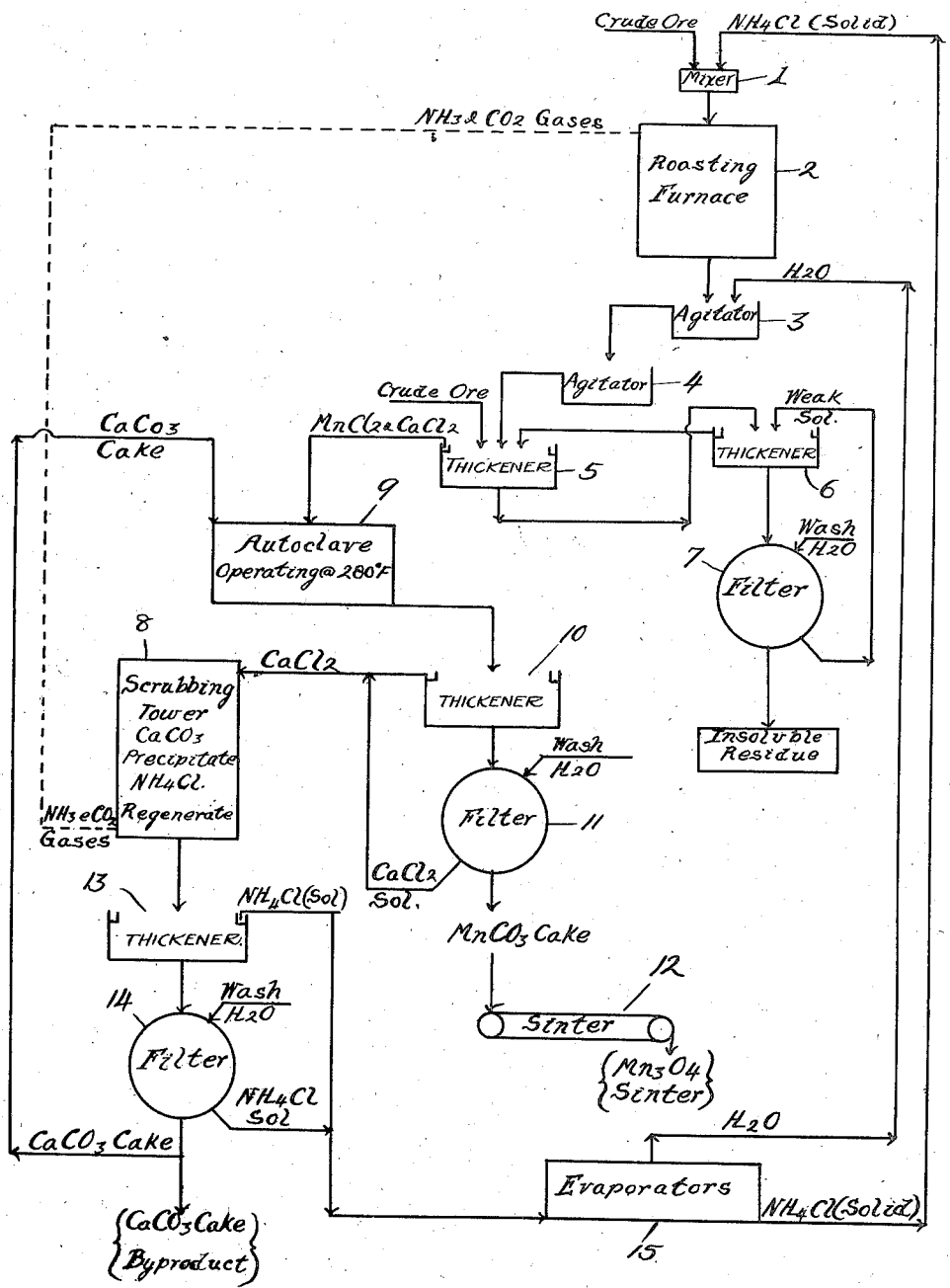

2,044,799

UNITED STATES PATENT OFFICE 2,044,799

PROCESS FOR EXTRACTING VALUES FROM MANGANESE CARBONATE ORES

John D. MacCarthy, Detroit, Mich., assignor to General Manganese Corporation, Detroit, Mich., a corporation of Delaware Application January 26, 1931, Serial No. 511,377
Renewed June 26, 1935

13 Claims. (Cl. 23—145)

The invention relates to the extraction of metals from ores and has for its object the obtaining of a process applicable to the economical treatment of relatively low grade ores containing various metals in the form of oxides, carbonates or other insoluble compounds. The invention consists in the novel method of converting these insoluble compounds into soluble compounds, thereby permitting of separation from the gangue by leaching. The invention further consists in various features of the process as hereinafter set forth.

While my improved process is applicable to the treatment of various ores containing different metals and in different chemical compounds, I will specifically describe its application to the treatment of a manganese carbonate ore such as one of the following analysis:

|  |  | Per cent |
|---|---|---|
| Dried 212° | Mn | 16.00 |
| | Fe | 11.00 |
| | P | .429 |
| | $SiO_2$ | 13.00 |
| | MgO | 1.80 |
| | CaO | 15.00 |
| | $Al_2O_3$ | 2.70 |
| | $CO_2$ loss | 26.00 |

The extraction and recovery of metal compounds from ores by means of this process involves essentially two steps; first, the digestion step whereby the ammonium salt is used to digest the ores to render one or more of the desired metal compounds soluble in order that they may later be separated from the insoluble residue known as the gangue; second, the precipitation step which provides for the precipitation of the desired metal compound or the differential precipitation of one or more of the desired metal compounds. The process is further improved by the fact that it is cyclic in that the reagent used in the digestion step is later recovered in the precipitation step and returned to repeat the cycle in treating additional ore.

It is to be noted that the features used in the first or digestion step consisting of digesting the ore with an ammonium salt and the addition of crude carbonate ore to precipitate the iron hydroxide from solution are described and claimed in the co-pending applications, Serial No. 329,983, filed September 16, 1929 and Serial No. 394,678, filed September 23, 1929 by the present applicant jointly with Andrew T. Sweet.

Both of these applications pertain to the recovery of manganese compounds from manganese carbonate ores by means of amonium salts. Serial No. 392,983 gives in detail the digestion of the ore by leaching methods. Serial No. 394.678 gives in detail the digestion of the ore by roasting methods. While either of these methods of digestion can be used to digest the ore as outlined in the present invention, the roasting method described in Serial No. 394,678 is preferably used and is hereinafter described in the detailed description of the preferred complete process and is illustrated in the accompanying flow sheet.

The principal features of the present invention reside in a novel differential precipitation method and the novel combination of the digestion and precipitation steps as hereinafter set forth.

In the detailed operation of this process on a carbonate ore of the type given above for example, where the desired compounds are compounds of manganese and calcium, the remainder being objectionable impurities and when using the specific reagent ammonium chloride, the following procedure would be preferably as shown by the flowsheet on the accompanying drawing.

In the first step the crude carbonate ore and the reagent ammonium chloride in proportionate quantities are mixed dry or preferably moist in the mixer 1, the mixture is passed into the roasting furnace 2 where the roasting digestion takes place at temperatures preferably below 700° F. This forms the soluble chloride of manganese, iron and calcium and results in the evolution of ammonia and carbon dioxide gases which are conducted to the scrubbing tower 8 and used as will be described later.

During the roasting the temperature in the furnace may be controlled to decompose the iron chloride into the insoluble oxide, the chloride ion being released to combine with the ammonia gas or additional ore in the upper part of the furnace. Any iron chloride remaining in the solution may be eliminated by adding crude carbonate ore at thickener 5 where the iron chloride attacks the crude ore forming additional manganese and calcium chloride and precipitates insoluble iron hydroxide. The addition of raw ore during the leaching is more fully set forth in the co-pending applications of the present inventor jointly with Andrew T. Sweet, Serial No. 359,155, filed April 29, 1929 and Serial No. 392,983, filed September 16, 1929.

The material from the furnace 2 is discharged into the agitators 3 and 4 where water is added in order to later separate the soluble chlorides from the insoluble impurities by means of the thickeners 5 and 6 and the filter 7.

In the second or precipitation step the solution from thickener 5 containing manganese and calcium chloride is placed in a closed container or autoclave 9 along with a proportionate quantity of precipitated calcium carbonate preferably obtained from the scrubbing tower 8 as hereinafter described. The temperature of the material is then raised to substantially above 212° F. with a corresponding increase in pressure; however, in treating this specific solution the material is raised to preferably 280° F. with a corresponding increase in pressure. After maintaining these conditions for a period of time depending upon the temperature, the quality, and the quantity of the materials being treated, the manganese is precipitated as an insoluble carbonate and the calcium carbonate is converted into additional soluble calcium chloride. The material is then removed from the autoclave 9 and separation is made at thickener 10 and filter 11, where manganese carbonate is recovered and later sintered at the sintering machine 12 into the oxide form consisting chiefly of $Mn_3O_4$ practically free from all of the objectionable impurities.

The remaining solution containing calcium chloride from thickener 10 is conducted to the scrubbing tower 8 where it is used to absorb the ammonia and carbon dioxide gases from the roasting furnaces in order to regenerate the reagent ammonium chloride and to reform, precipitate and recover both the calcium carbonate used in the process and the calcium carbonate from the ore. This material is separated at thickener 13 and filter 14. The calcium carbonate consumed in the process at autoclave 9 is returned to the cycle and the calcium carbonate from the ore is recovered as a desired by-product. The ammonium chloride solution is evaporated at the evaporators 15 to the solid state and returned to complete the cycle. Thus in the above ore cited for example, the desired manganese compound has been recovered practically free from any objectionable impurities and by means of the novel precipitation step a separation has been effected between the manganese and the calcium compounds.

What I claim as my invention is:

1. In the process of extracting metal compounds from ores containing manganese compounds, the steps of treating a solution comprising manganese chloride in a closed container together with a proportionate quantity of precipitated calcium carbonate and raising the temperature to substantially above 212° F. with a corresponding increase in pressure to precipitate and recover the manganese as the insoluble manganese carbonate and to form soluble calcium chloride.

2. The process of recovering manganese carbonate from solutions containing manganese and calcium chlorides which comprises placing the said solutions together with a proportionate quantity of precipitated calcium carbonate in a closed container and raising the temperature to substantially above 212° F. with a corresponding increase in pressure to precipitate and recover the manganese as the insoluble carbonate and to form additional calcium chloride.

3. The process of recovering metal compounds from ores containing manganese and calcium carbonates which comprises roasting the ore with ammonium chloride to form the soluble chlorides of manganese and calcium, resulting in the evolution of ammonia and carbon dioxide gases, separating the soluble chlorides of manganese and calcium from the insoluble residue by leaching, placing the solution together with a proportionate quantity of precipitated calcium carbonate in a closed container and heating the same to substantially above 212° F. with a corresponding increase in pressure to precipitate insoluble manganese carbonate and form additional soluble calcium chloride, separating and treating the calcium chloride with the said ammonia and carbon dioxide gases in order to reform the calcium carbonate consumed in the process, to reform the calcium carbonate from the ore and to reform the reagent ammonium chloride and separating and evaporating the same to the original state in order to repeat the cycle.

4. The process of recovering metal compounds from ores containing manganese carbonate, iron, calcium and insoluble compounds which comprises roasting the ore with ammonium chloride to form soluble chlorides of manganese, iron and calcium, resulting in the evolution of ammonia and carbon dioxide gases, controlling the temperature in the furnace to decompose the iron chloride into the insoluble iron oxide, separating the soluble chlorides of manganese and calcium from the insoluble residue by leaching, placing the solution together with a proportionate quantity of precipitated calcium carbonate in a closed container and heating the same to a temperature substantially above 212° F. with a corresponding increase in pressure to precipitate insoluble manganese carbonate and to form additional soluble calcium chloride, separating and treating the calcium chloride with the said ammonia and carbon dioxide gases in order to precipitate insoluble calcium carbonate and to reform the reagent ammonium chloride and separating and evaporating the same to the original state in order to repeat the cycle.

5. The process of recovering metal compounds from ores containing manganese and calcium carbonates, iron and insoluble compounds which comprises roasting the ore with ammonium chloride to form soluble chlorides of manganese, iron and calcium, resulting in the evolution of ammonium and carbon dioxide gases, separating the soluble chlorides of manganese and calcium from the insoluble residue by leaching, adding manganese carbonate ore to precipitate insoluble iron hydroxide and to form additional soluble chlorides of manganese and calcium, separating and placing the solution together with a proportionate quantity of precipitated calcium carbonate in a closed container and heating the same to a temperature substantially above 212° F. with a corresponding increase in pressure to form insoluble manganese carbonate and additional soluble calcium chloride, separating and treating the calcium chlorides with the said ammonia and carbon dioxide gases to reform the calcium carbonate consumed to recover the calcium carbonate from the ore and to reform the reagent ammonium chloride and separating and evaporating the same to the original state in order to repeat the cycle.

6. The process of recovering metal compounds from ores containing calcium carbonate, manganese, iron and insoluble compounds which comprises roasting the ore with ammonium chloride at a temperature below 700° F. to form soluble chlorides of manganese, iron and calcium, resulting in the evolution of ammonia and carbon dioxide gases, controlling the temperature in the furnace to decompose the soluble iron chloride into the insoluble oxide, separating the soluble chlorides of manganese and calcium from the insoluble residue by leaching, placing the solution together with a proportionate quantity of precipitated calcium carbonate in a closed container and heating the same to a temperature substantially above 212° F. with a corresponding increase in pressure to form insoluble manganese carbonate and additional soluble calcium chloride, separating and treating the calcium chloride with the said ammonia and carbon dioxide gases to reform the calcium carbonate consumed in the process, to reform the calcium carbonate recovered from the ore and to reform the reagent ammonium chloride and separating and evaporating the same to the original state in order to repeat the cycle.

7. The process of recovering metal compounds from ores containing manganese and calcium carbonates, iron and insoluble compounds which comprises roasting the ore with ammonium chloride at a temperature below 700° F. to form soluble chlorides of manganese, iron and calcium, resulting in the evolution of ammonia and carbon dioxide gases, controlling the temperature in the furnace to decompose the soluble iron chloride into the insoluble oxide, separating the soluble chlorides of manganese and calcium from the insoluble residue by leaching, placing the solution together with a proportionate quantity of precipitated calcium carbonate in a closed container and heating the same to a temperature substantially above 212° F. with a corresponding increase in pressure to form insoluble manganese carbonate and additional soluble calcium chloride, separating and treating the calcium chloride with said ammonia and carbon dioxide gases to reform the calcium carbonate consumed in the process, to reform the calcium carbonate recovered from the ore and to reform the reagent ammonium chloride and separating and evaporating the ammonium chloride to the original state in order to repeat the cycle.

8. The process of recovering metal compounds from ores containing manganese and calcium carbonates, iron and insoluble compounds which comprises roasting the ore with ammonium chloride at a temperature below 700° F. to form the soluble chlorides of manganese, iron and calcium and resulting in the evolution of ammonia and carbon dioxide gases, separating the soluble chlorides from the insoluble residue by leaching, adding manganese carbonate ore to precipitate insoluble iron hydroxide and to form additional soluble chlorides of manganese and calcium, separating and placing the solution together with a proportionate quantity of precipitated calcium carbonate in a closed container and heating the same to approximately 280° F. with a corresponding increase in pressure to form insoluble manganese carbonate and additional soluble calcium chloride, separating and treating the calcium chloride solution with said ammonia and carbon dioxide gases to reform the calcium carbonate consumed in the process, to reform the calcium carbonate recovered from the ore and to reform the reagent ammonium chloride and separating and evaporating the ammonium chloride to the original state in order to repeat the cycle.

9. The process of recovering metal compounds from ores containing manganese, magnesium and calcium carbonates, iron and insoluble compounds which comprises roasting the ore with ammonium chloride at a temperature below 700° F. to form the soluble chlorides of manganese, iron, magnesium and calcium, separating the soluble chlorides from the insoluble residue, adding manganese carbonate ore to precipitate insoluble iron hydroxide and to form additional soluble chlorides, separating the soluble chlorides of manganese, magnesium and calcium by leaching and placing the solution together with a proportionate quantity of precipitated calcium carbonate in a closed container and heating the same to approximately 280° F. with a corresponding increase in pressure to form insoluble manganese carbonate and additional soluble calcium chloride, separating and treating the magnesium and calcium chlorides with said ammonia and carbon dioxide gases to reform the calcium carbonate consumed in the process, to reform the magnesium and calcium carbonates recovered from the ore and to reform the reagent ammonium chloride and separating and evaporating the ammonium chloride to the original state in order to repeat the cycle.

10. The process of recovering manganese carbonate from a solution comprising manganese chloride which comprises treating said manganese chloride solution in a closed container together with a proportionate quantity of precipitated alkaline earth carbonate, raising the temperature to substantially above 212° F. with a corresponding increase in pressure to precipitate and recover insoluble manganese carbonate and to form soluble alkaline earth chloride, separating the solution from the precipitate, treating said solution of alkaline earth chloride with ammonia and carbon dioxide gases to precipitate alkaline earth carbonate and form ammonium chloride solution, separating the solution from the precipitate and using said precipitated alkaline earth carbonate to repeat the cycle.

11. The process of recovering manganese carbonate from a solution comprising manganese chloride which comprises treating said manganese chloride solution in a closed container together with a proportionate quantity of precipitated calcium carbonate, raising the temperature to substantially above 212° F. with a corresponding increase in pressure to precipitate and recover insoluble manganese carbonate and to form soluble calcium chloride, separating the solution from the precipitate, treating said solution of calcium chloride with ammonia and carbon dioxide gases to precipitate calcium carbonate and form ammonium chloride solution, separating the solution from the precipitate and using said precipitated calcium carbonate to repeat the cycle.

12. The process of recovering metal compounds from ores containing manganese and calcium carbonates which comprises reacting said ore and ammonium chloride to form a solution containing manganese chloride resulting in the evolution of ammonia and carbon dioxide gases, treating said manganese chloride solution in a closed container together with a proportionate quantity of precipitated alkaline earth carbonate, raising the temperature to substantially above 212° F. with a corresponding increase in pressure to precipitate and recover insoluble manganese carbonate and to form soluble alkaline earth chloride, separating the solution from the precipitate, treating said solution of alkaline earth chloride with ammonia and carbon dioxide gases to precipitate alkaline earth carbonate and form ammonium chloride solution, separating the solution from the precipitate, evaporating said ammonium chloride solution to form the ammonium chloride in its original state in order to repeat the cycle with additional ore and utilizing the precipitated alkaline earth carbonate to repeat the cycle with additional manganese chloride solution.

13. The process of recovering metal compounds from ores containing manganese and calcium carbonates which comprises reacting said ore and ammonium chloride to form a solution containing manganese chloride resulting in the evolution of ammonia and carbon dioxide gases, treating said manganese chloride solution in a closed container together with a proportionate quantity of precipitated calcium carbonate, raising the temperature to substantially above 212° F. with a corresponding increase in pressure to precipitate and recover insoluble manganese carbonate and to form soluble calcium chloride, separating the solution from the precipitate, treating said solution of calcium chloride with ammonia and carbon dioxide gases to precipitate calcium carbonate and form ammonium chloride solution, separating the solution from the precipitate, evaporating said ammonium chloride solution to form the ammonium chloride in its original state in order to repeat the cycle with additional ore and utilizing the precipitated calcium carbonate to repeat the cycle with additional manganese chloride solution.

JOHN D. MacCARTHY.